United States Patent [19]
Tokashiki et al.

[11] Patent Number: 6,166,935
[45] Date of Patent: Dec. 26, 2000

[54] INVERTER APPARATUS WITH OFF SIGNAL OF AT LEAST MINIMUM TIME DURATION

[75] Inventors: Mutsuo Tokashiki, Funabashi; Naoki Takata, Narashino; Akiko Ishii, Funabashi, all of Japan

[73] Assignee: Hitachi, Ltd., Tokyo, Japan

[21] Appl. No.: 09/342,132

[22] Filed: Jun. 29, 1999

[30] Foreign Application Priority Data

Jun. 29, 1998 [JP] Japan .................................. 10-182740

[51] Int. Cl.[7] ............................. H02M 5/42; H02M 7/44
[52] U.S. Cl. ................................................ 363/98; 363/56
[58] Field of Search .............................. 363/17, 131, 132, 363/98, 56

[56] References Cited

U.S. PATENT DOCUMENTS

5,019,953  5/1991  Kawaberi et al. ........................ 363/21
5,274,541 12/1993  Kimura et al. ............................ 363/56
5,929,665  7/1999  Ichikawa et al. ......................... 363/98

*Primary Examiner*—Peter S. Wong
*Assistant Examiner*—Bao Q. Vu
*Attorney, Agent, or Firm*—Antonelli, Terry, Stout & Kraus, LLP

[57] ABSTRACT

An inverter apparatus having at least an inverting portion for inverting a DC electric power into an AC electric power, wherein the inverting portion includes: high speed switching elements; driver circuits for driving the high speed switching element; and a controller portion for outputting logical driving ON/OFF signals for controlling the AC electric power to the driver circuit, wherein the controller portion controls so that the minimal time of the OFF signal of the logical driving ON/OFF signals for the high speed switching element comes to be equal or greater than a predetermined value, thereby protecting the high speed switching elements constructing the inverter apparatus from breakdown due to a the short OFF pulse.

6 Claims, 10 Drawing Sheets

IN CASE OF SHORT COMMUTATION TIME

INJECTION OF HOLES

FIG. 5b

IN CASE OF LONG COMMUTATION TIME

FIG. 5c

DISTRIBUTION OF HOLES IN REVERSE BIAS CONDITION

PRIOR ART

6,166,935

INVERTER APPARATUS WITH OFF SIGNAL OF AT LEAST MINIMUM TIME DURATION

BACKGROUND OF THE INVENTION

1. Field of the Invention

The present invention relates to an inverter apparatus having an inverting portion therein, in particular, relates to an inverter apparatus in which a high speed switching element can be used as a main element suitably.

2. Description of Related Art

Conventionally, in use of a switching element, such as a GTO, it is said that the turn-on mechanism starts in a vicinity of the gate thereof and it spreads out and expands to a whole thereof sequentially. The velocity of this spreading out is approximately 0.03–0.1 mm/$\mu$s.

A switching current almost rises up during a time period which is less than several $\mu$s in a turn-ON time. Therefore, in an initial period of the turn-ON, total current concentrates in the vicinity of the above-mentioned gate to increase an electric power loss per a unit area in the turn-ON region, thereby melting the vicinity of the gate which is destroyed.

For preventing such destruction, conventionally, various technologies are proposed, including a provision of such as so-called a snubber circuit, and as one of them, a minimal ON/OFF time is determined for a gate pulse for the purpose of restricting time sequential change in a switching current.

Figure 11:
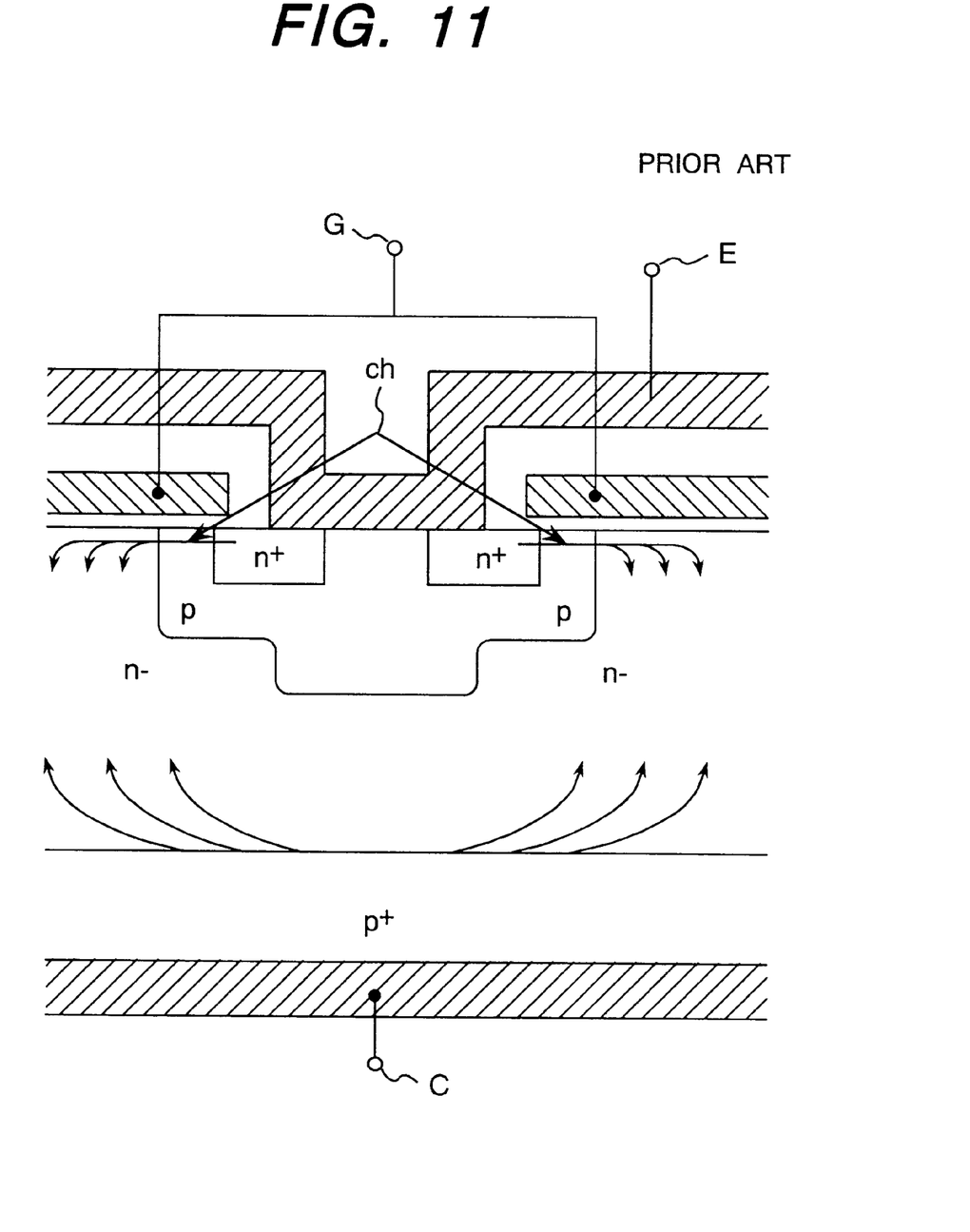
FIG. 11 shows a basic construction of a n-channel IGBT of the conventional art, for explaining a reason that the minimum OFF time is restricted therein.

However, with an IGBT (abbreviation of "insulated gate bipolar transistor") or MOS-FET as one of a high speed switching element, to which the present invention relates, there is defined or established no such the time restriction, such as the minimal ON/OFF time or the like. The reasons of no such the restriction will be studied by referring to FIG. 11. FIG. 11 shows a basic construction of a n-channel type IGBT.

In the n-channel type IGBT shown in the figure, when a positive voltage is applied to a gate electrode G, on a basis of that of an emitter electrode E, the surface concentration of a p layer just under the gate electrode G is reversed to form a n channel ch, thereby conducting current due to electrons in a n minus ($n^-$) layer.

Further increasing up the gate voltage, and when it comes to be greater than a gate threshold voltage, the electron current flowing through the channel is amplified, and at the same time, since a p plus layer (hereinafter, it is described by "$p^+$ layer") and a n minus layer (hereinafter, it is described by "$n^-$ layer") are biased in a forward direction, hole injection occurs from the $p^+$ layer and the resistance value of the $n^-$ layer comes to be small, thereby obtaining an operation of high current density.

As can be seen from the above operation of high current density, it is because, in particular in the IGBT, due to multi-channels being formed with scattered diffusion areas as well as the skin effect, no such current concentration occurs as in the GTO, thereby occurring no destruction in the vicinity of the gate electrode G due to the electric power loss.

As mentioned in the above, no particular attention was paid to the time of the driving signals for the high speed switching elements, such as the IGBT or the MOS-FET, within a conventional inverter apparatus, therefore, ON/OFF signals obtained as calculation results from a controller portion are outputted irregularly (without restriction) as the driving signals for them.

However, because of development of high speed micro-computers in recent years, even the driving logical ON/OFF signals, being shorter than 0.1 $\mu$sec in the time duration thereof, can be outputted from the controller portion, into which such the high speed micro-computer is applied.

Therefore, in particular, with an OFF pulse to the IGBT, if an ON pulse is inputted again when the current does not decrease down sufficiently, the di/dt in the IGBT comes to be abrupt or sharp, thereby causing vibration on the voltage between the collector C and the emitter E thereof (hereinafter, it is described as "Vce"). And, if a fly wheel diode reversibly connected but in parallel (hereinafter, described as "FWD") is inferior in the characteristic, i.e., in the reverse recovery characteristic, there is a problem that the IGBT possibly reaches to effect destruction or breakdown thereof.

SUMMARY OF THE INVENTION

An object, according to the present invention, for dissolving the above problems which were neglected conventionally but appear out in recent years, is to provide an inverter apparatus, wherein the OFF signal is managed or controlled, so as to protect the high speed switching elements, such as the IGBT or MOS-FET, as well as the apparatus applying them therein, from breakdown thereof and further malfunction of the apparatus, with driving logic ON/OFF signals for the high speed switching element, in particular, with the OFF signal having such short time duration, which causes the sharpened di/dt of the high speed switching element and erroneous detection of short-circuiting thereof.

According to the present invention, for dissolving the above-mentioned objects, there is provided an inverter apparatus having at least an inverting portion for inverting a DC electric power into an AC electric power, wherein said inverting portion includes:

a high speed switching element;

a driver circuit for driving said high speed switching element; and a controller portion for outputting logical driving ON/OFF signals to the driver circuit for controlling the AC electric power, wherein the controller portion controls so that time duration of the OFF signal of the logical driving ON/OFF signals to the high speed switching element comes to be equal or greater than a predetermined minimal value.

Also, according to the present invention, there is provided an inverter apparatus as defined in the above, wherein the controller portion controls the time duration of the OFF signal to be equal or greater than a dead time of said high speed switching element.

And also, according to the present invention, there is provided an inverter apparatus further comprising means for supervising the time duration of the OFF signal, wherein the controller portion controls the time duration of the OFF signal on basis of supervised signal of the supervising means.

Further, according to the present invention, there is also provided an inverter apparatus as defined in the above, wherein the high speed switching element is IGBT.

Further, according to the present invention, there is also provided an inverter apparatus as defined in the above, wherein the high speed switching element is MOS-FET.

Further, according to the present invention, there is also provided an inverter apparatus as defined in the above, wherein the predetermined minimal value is at least 3 $\mu$sec.

Moreover, according to the present invention, there is also provided an inverter apparatus as defined in the above, wherein the predetermined minimal value is determined at least depending upon input capacity of the high speed switching element.

Furthermore, according to the present invention, there is also provided an inverter apparatus as defined in the above, wherein the high speed switching elements are provided in plurality, being formed in a bridge including a plurality of arms therewith.

And, lastly, according to the present invention, there is also provided an inverter apparatus as defined in the above, wherein further a flywheel diode is provided, being reversely connected across the high speed switching element of each of the plural arms of the bridge in parallel.

DESCRIPTION OF THE PREFERRED EMBODIMENTS

Hereinafter, detailed explanation of an inverter apparatus as an embodiment according to the present invention will be given by referring to the attached FIGS. 1 to 10.

[Embodiment 1]

Figure 1:
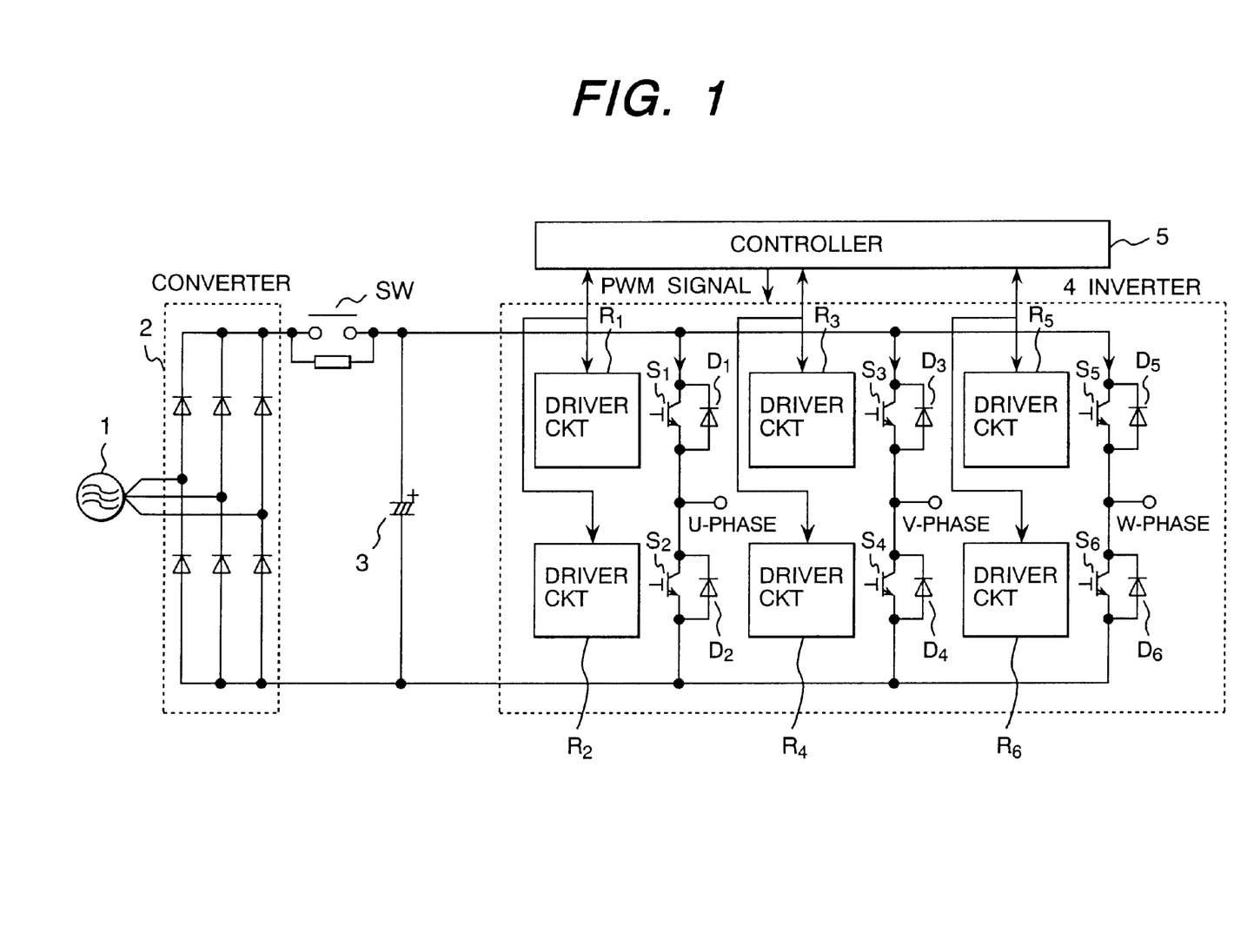
FIG. 1 shows a circuit diagram of an inverter apparatus according to the present invention.

FIG. 1 shows a block diagram of showing the construction of an embodiment, i.e., a PWM type inverter apparatus, according to the present invention, but is constructed in similar manner of a general PWM type inverter apparatus. With this PWM type, by changing the pulse width of a rectangular wave output voltage in each constant period, an output voltage is controlled.

In FIG. 1, an alternation current (AC) electric power from an AC power source 1 is rectified in a converter portion 2 to be converted into a direct current (DC) voltage. The DC voltage is smoothed with an electrolysis capacitor 3, and is inverted into an AC electric power in an inverter portion 4.

Here, a high speed switching element (main element) mentioned, in particular according to the present invention, means such a switching element, which can perform ON/OFF operation with switching speed being higher than (rated current)/3 $\mu$sec or (rated voltage)/3 $\mu$sec, i.e., rising the output current or voltage to the rated values thereof within 3 $\mu$sec, and in more detail, now it can be realized by applying such as an IGBT or a MOS-FET, for example.

A bridge circuit of the inverter portion 4 comprises: an upper arm, being composed of a switching element including an IGBT $S_1$ and a FWD $D_1$ connected in parallel but in reverse direction thereacross, a switching element including an IGBT $S_3$ and a FWD $D_3$, and a switching element including an IGBT $S_5$ and a FWD $D_5$; and a lower arm, being composed of a switching element including an IGBT $S_2$ and a FWD $D_2$ connected in parallel but in reverse direction thereacross, a switching element including an IGBT $S_4$ and a FWD $D_4$, and a switching element including an IGBT $S_6$ and a FWD $D_6$. For three sets of switching elements of the upper arm are provided driver circuits $R_1$, $R_3$ and $R_5$, and for three sets of switching elements of the lower arm driver circuits $R_2$, $R_4$ and $R_6$, respectively. Further, the DC electric power can be turned ON or OFF by a switch 20 from the converter portion 2 to the inverter portion 4.

The driver circuits $R_1$, $R_2$ ... $R_6$ for driving the respective IGBTs $S_1$, $S_2$ ... $S_6$ are provided for each of the switching elements. Or, they can be constructed with only four (4) driver circuits by driving the lower arms with only one driver circuit in common.

Or, corresponding to the output voltage and the output frequency being calculated in the controller portion 5, PMW (Pulse Width Modulation) signals are outputted as the ON/OFF signals to the driver circuits $R_1$, $R_2$ ... $R_6$.

Figure 2:
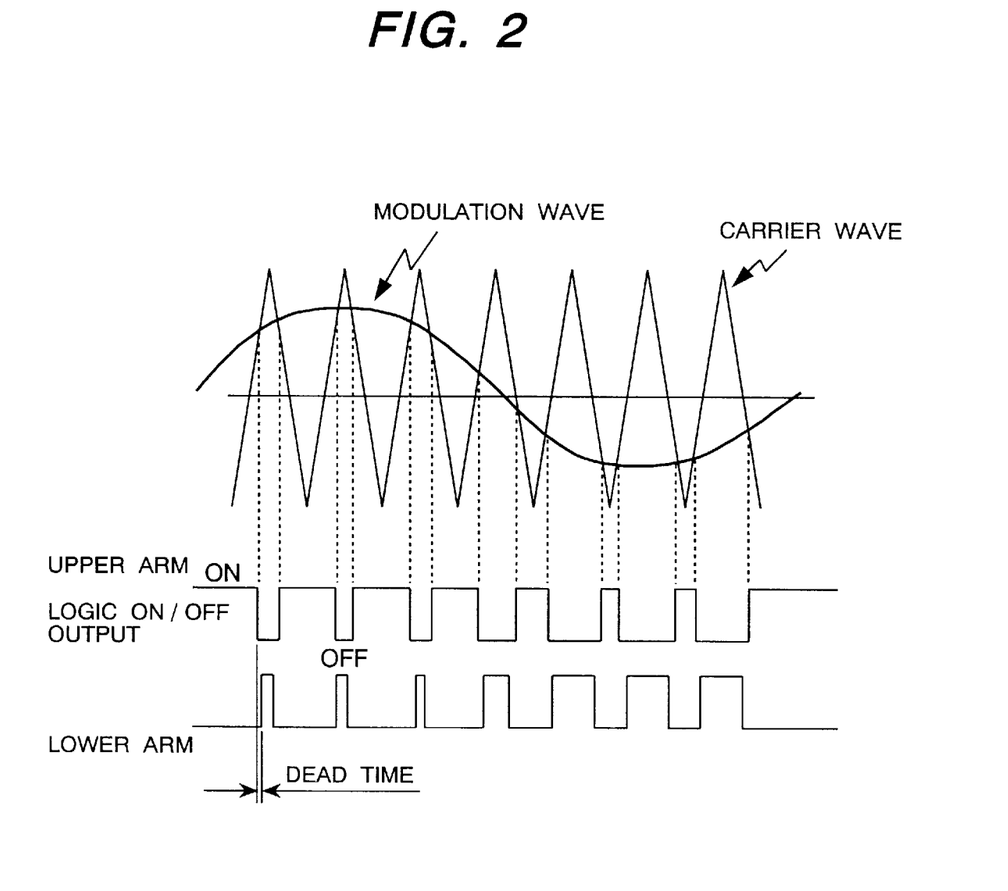
FIG. 2 shows wave-forms at various portions in the inverter apparatus shown in FIG. 1 for explaining operation thereof.

In FIG. 2, there is shown signal wave-forms at various portions in process of generating the output logic signals to be outputted to the driver circuits $R_1$, $R_2$ ... $R_6$ of each of the IGBT from the controller portion 5. In the inverter of the PWM method shown in FIG. 1, as shown in FIG. 2, a switching signal is outputted by comparing a voltage instruction signal (a modulated wave signal) with a triangular wave transmission signal.

Comparing between the transmission signal and the voltage instruction signal, if the voltage instruction signal is greater than the transmission signal, an ON signal is outputted, while if it is smaller than that, an OFF signal is outputted. In the Fig., after determining the logic ON/OFF signals for the upper arm of the three phase bridge circuit, the logic ON/OFF signals for the lower arm are determined by subtracting them by a dead time.

Here, the dead time means an inoperative time being provided between the ON/OFF of the IGBT $S_1$ of the upper arm and the OFF/ON of the IGBT $S_2$ of the lower arm for protecting from a short-circuiting at the electric power side, since it occurs when the IGBT $S_1$ of the upper arm and the IGBT $S_2$ of the lower arm are turned ON at the same time, and it is approximately from 3 $\mu$sec to 6 $\mu$sec, actually.

However, in practice, the above-mentioned ON/OFF signals are formed by adding the above-mentioned driving logic ON/OFF signals with a compensation, depending upon the polarity of current (positive or negative) and the characteristics of the IGBTs $S_1$, $S_2$ ... $S_6$, in particular, for the OFF signal to ensure the dead time (inoperative time) on the time duration thereof, sufficiently.

In this manner, by turning ON/OFF the IGBTs $S_1$, $S_2$ ... $S_6$ with the above-mentioned switching signals, a rectangular output voltage of high frequency can be obtained which is proportional to the voltage instruction signal (modulated wave signal), and if varying the said instruction signal (modulated wave signal) in sinusoidal wave-form can be obtained an AD output voltage. Here, a saw-tooth wave signal can be used as the transmission wave in place of the triangular wave.

Next, by referring to FIGS. 3(a) and (b), explanation will be given on the commutation from the IGBT to the FWD. Now, as an example, the IGBT $S_1$ and FWD $D_1$, and the IGBT $S_2$ and FWD $D_2$ will be explained.

Figure 3A:
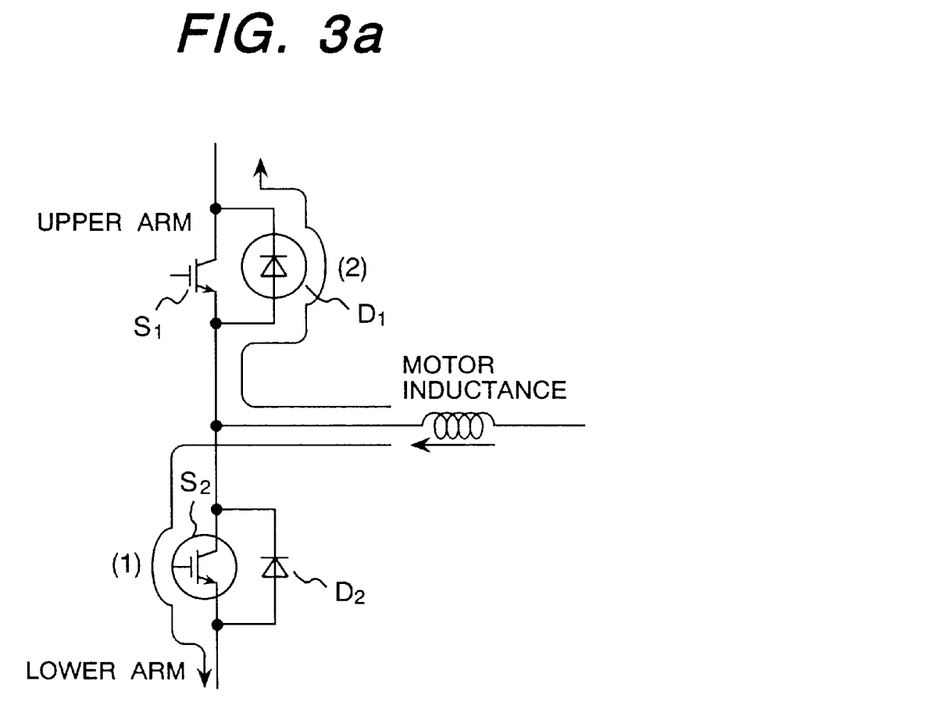
FIGS. 3(a) and (b) are views for explaining commutation from IGBT to FWD in the inverter apparatus shown in FIG. 1 and for showing wave-forms of gate voltage in that instance.
Figure 3B:
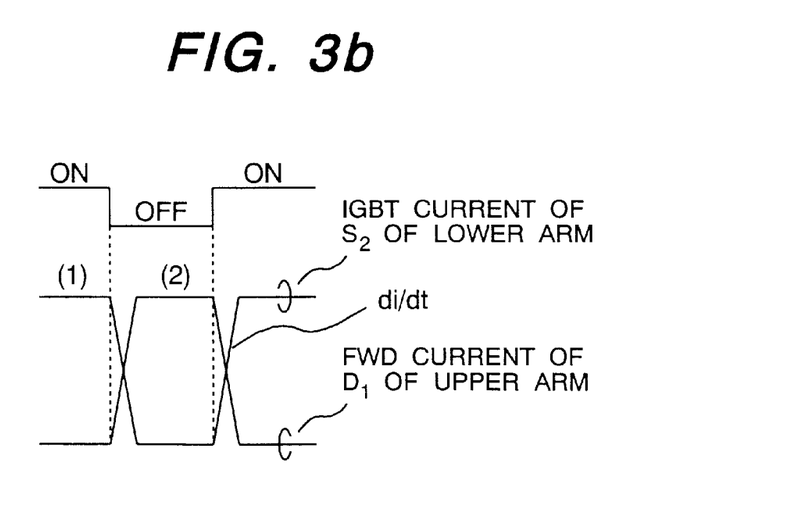

Now, as shown in FIG. 3(a), assuming that current is flowing to a motor inductance in the direction shown in Fig., the IGBT $S_2$ of the lower arm is in the ON condition, and the current flows in the direction (1) indicated in FIG. 3(b).

Next, when turning the IGBT $S_2$ of the lower arm into OFF condition, the current is kept to be a constant due to electromotive force of the motor inductance, and it makes commutation to the FWD $D_1$ of the upper arm to flow as indicated by (2) in FIG. 3(a).

Also, an inclination of current taking commutation from (1) to (2) or from (2) to (1) is determined by di/dt when turning ON/OFF of the IGBT $S_1$ or IGBT $S_2$. Each FWD, which is connected across the each IGBT in parallel but in the reverse direction, is provided ordinarily corresponding to the ON/OFF characteristics thereof, therefore it has the characteristics of being enabling the commutation corresponding to the di/dt characteristic under a normal operation.

Figure 4:
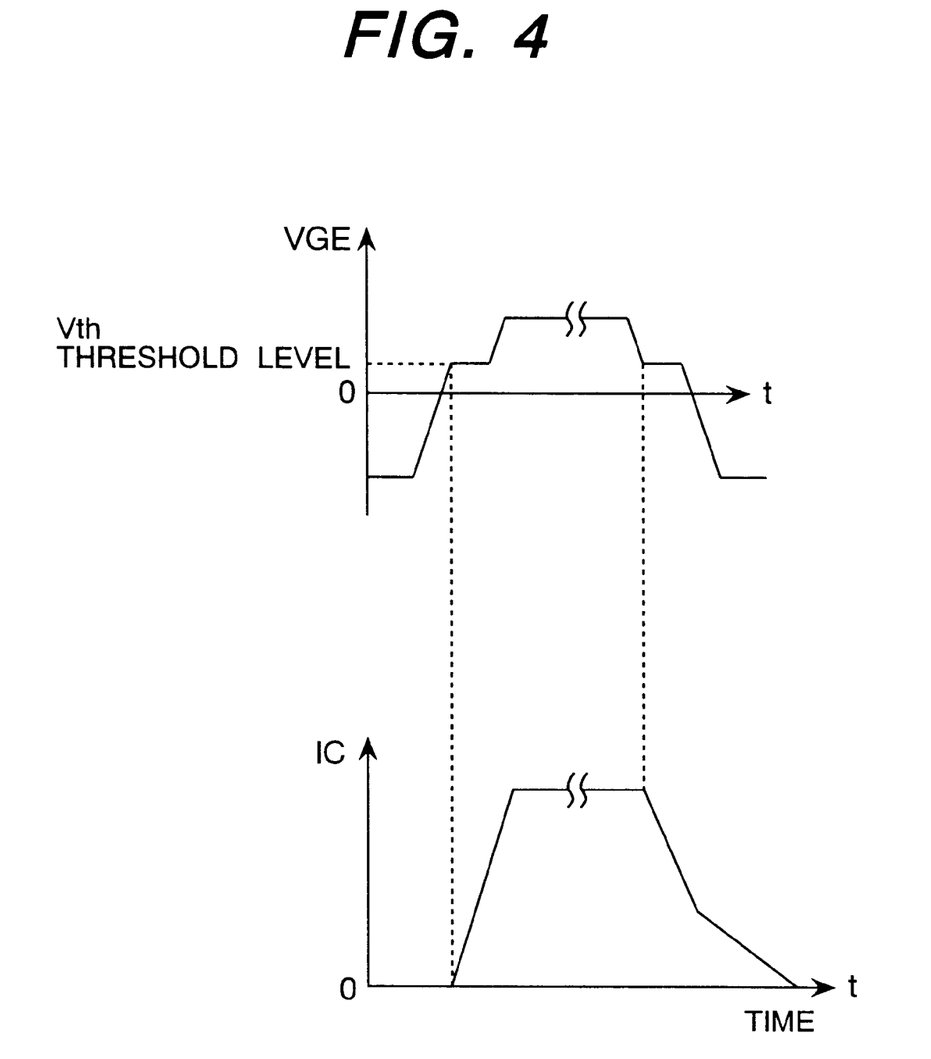
FIG. 4 shows wave-forms of the gate voltage and collector current in the IGBT in the upper and lower portions of the figure, respect.

Next, by referring to the wave-forms shown in FIG. 4, explanation will be given on a relationship between a gate voltage (hereinafter, is described as "Vge") and a collector current (hereinafter, is described as "Ic"). In giving general explanation hereinafter, each element is indicated by only mark with omitting an affix thereof.

When the IGBT is in ON condition, after the Vge rises up to a threshold level (hereinafter, is described as "Vth") of the IGBT, the Ic begin to flow. When it is in OFF condition, after it decreased down to the Vth, the Ic begin to be interrupted. For turning ON the IGBT must be applied a voltage, being less than a rated gate/emitter voltage, as two or three times large as the Vth, generally approximately 15 V.

By referring to FIG. 5, explanation will be given on the di/dt characteristic of the IGBT.

Figure 5A:
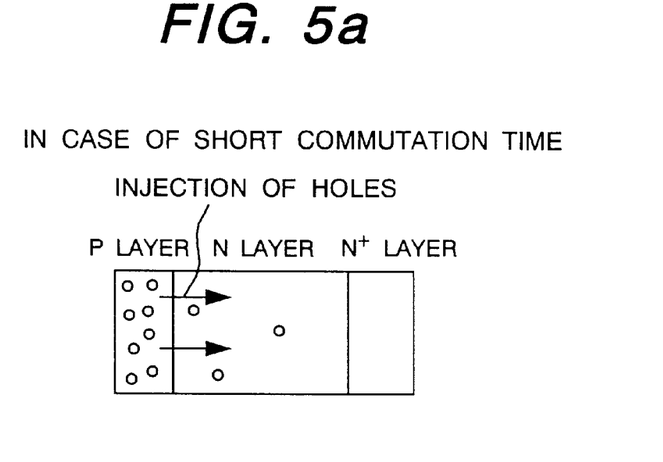
FIGS. 5(a) through (c) are views for showing the distribution of holes in a FWD in various conditions thereof.
Figure 5B:
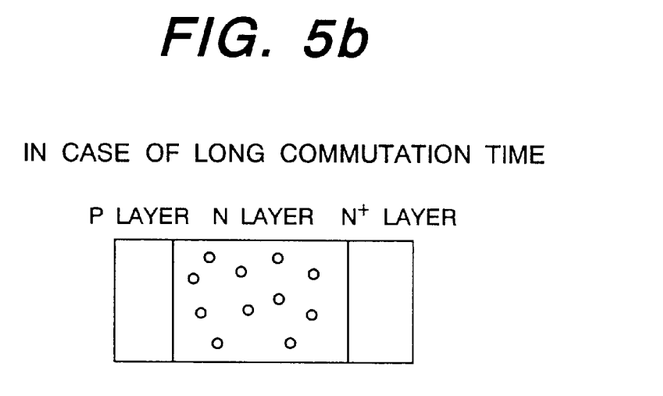

FIG. 5 shows distribution of holes in each condition of the FWD which is reversely connected across the IGBT in parallel. FIG. 5(a) shows the hole distribution when the Ic current turns ON for a short time period, while FIG. 5(b) that when the Ic current turns ON for a long time period.

As explained in FIG. 11 relating the prior art mentioned above, when the Vge rises up higher than Vth, the conjunction between the $P^+$ layer and $n^-$ layer is biased in forward direction, as well as the electron current flowing through the channel increases up, thereby occurring injection of the holes from the $P^+$ layer to initiate accumulation of minority carriers.

Studying FIGS. 5(a) and 5(b) here, it is appear that injection of holes is small as in FIG. 5(a), on the other hand it is large as in FIG. 5(b).

Next, by referring to FIG. 3, explanation will be given on the change in currents in the upper arm and the lower arm, in particular, by taking up a U phase for example.

When the IGBT $S_2$ of the lower arm shown in FIG. 3(a) is turned OFF, the current flowing through the IGBT $S_2$ comes to be as (1). And the current (2) flows in the FWD $D_1$ of the upper arm.

If the time for commutation is short under the above-mentioned condition, as shown in FIG. 5(a), the injection and the storage of holes within the IGBT $S_2$. Here, if the electric power SW is turned from OFF to ON, i.e., from FIG. 5(a) to a reverse biasing condition in FIG. 5(c), as mentioned in the above, since the existence of the holes being stored therein is small, a depletion layer is formed quickly, thereby rising up the current quickly, i.e., large di/dt. Namely, the reverse recovery characteristic is lowered.

Figure 5C:
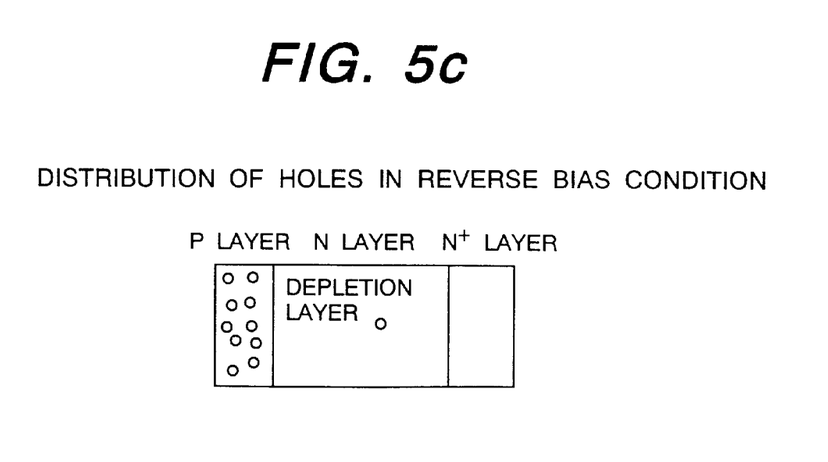

When the IGBT $S_2$ of the lower arm shown in FIG. 3(a) is turned OFF, of course it is the same that the current flowing through the IGBT $S_2$ comes to be as (1) and the current (2) flows in the FWD $D_1$ of the upper arm, however, if the time for commutation is long, since the injection of holes is large, even if the electric power SW of the IGBT $S_2$ is turned from OFF to ON so as to bring from FIG. 5(b) into the reverse bias condition in FIG. 5(c), since the injected holes is large, it takes a long time to turn into the depletion layer, therefore the di/dt does not come to be large.

From the above explanation, current flowing for recovery in the reverse direction differs depending upon amount (i.e., large or small) of holes stored within the FWD element being reversely connected across the IGBT in parallel. Namely, when turning from FIG. 5(a) or FIG. 5(b) into the reverse bias condition shown in FIG. 5(c), there occurs no problem in shifting from the condition of FIG. 5(b) into the condition of FIG. 5(c), however, in shifting from the condition of FIG. 5(a) into the condition of FIG. 5(c), since the injection of holes from the $p^+$ layer to the $n^-$ layer is small and also the holes stored within the $n^-$ layer is in small number, the current flowing into the reverse direction for recovery comes to be small, therefore the depletion layer expands abruptly, as shown in the figure, thereby rising up the current changing rate (di/dt) in the recovery so as to lower the reverse recovery time characteristic of the FWD.

Next, in FIG. 6, explanation will be given on an operation mechanism (in a case where modulated wave signal instruction signal exceeds the transmission signal) in a case where the OFF signal comes to be short.

As mentioned above, the controller portion 5 outputs the logic ON/OFF signal by comparing the modulated wave signal of a phase voltage instruction and the transmission wave signal. When the modulated wave signal is larger than the transmission wave signal, the logic ON signal is outputted. On the contrary, the logic OFF signal is outputted.

Figure 6:
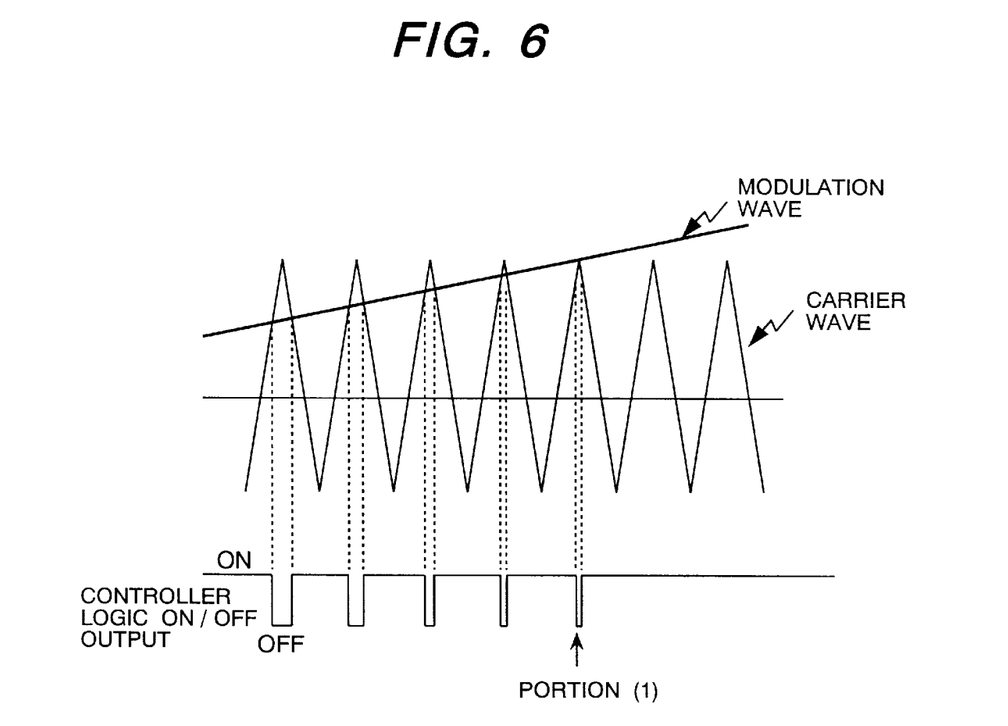
FIG. 6 shows wave-forms at various portions of the inverter apparatus for explaining the mechanism in shortening the OFF signal therein.

In the inverter apparatus, as shown in FIG. 6, since the voltage is risen up to the predetermined voltage of the motor, there happen many occasion where the modulated wave signal exceeds the transmission wave signal.

In a case of the portion (1) of FIG. 6, even in a case of the OFF signal in which the modulated wave signal exceeds the transmission wave signal by a little, a micro-computer of recent years also outputs a high speed operation signal corresponding to it.

Figure 7:
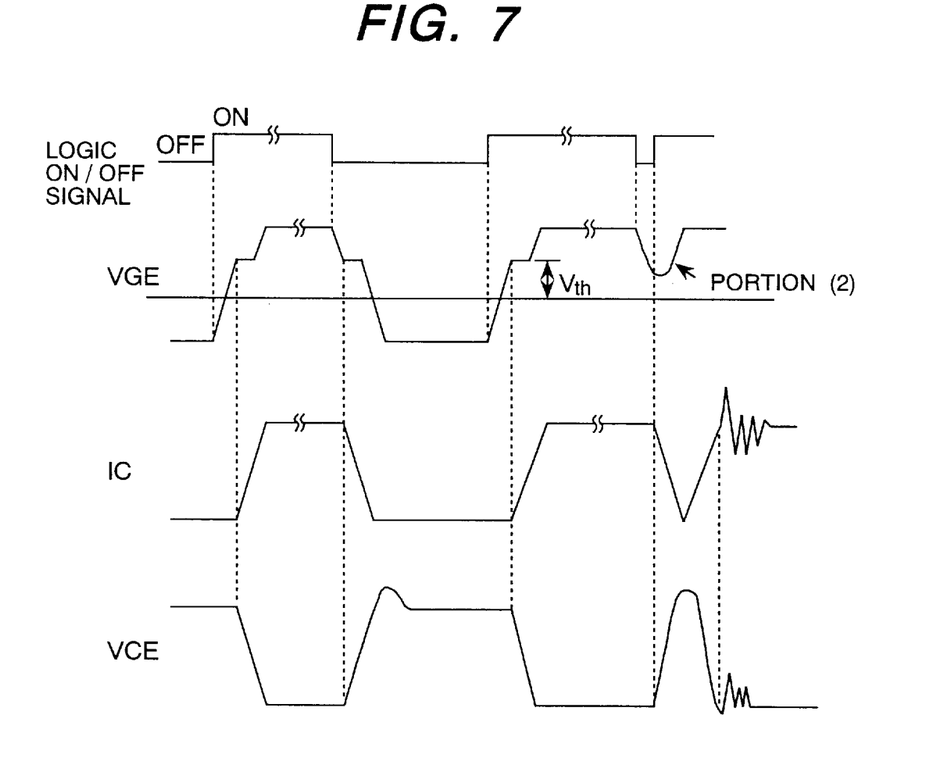
FIG. 7 is a view for explaining the operation of the IGBT with the various driving signals.

By referring to FIG. 7, explanation will be given on a case where the said OFF signal is actually outputted to the IGBT.

As was explained in the above, the Ic in the IGBT rises up the di/dt thereof when the logic ON signal is applied from time point when the condition of the Vge voltage is established. However, as is shown in the portion (2) in FIG. 7, if the next ON signal is inputted when the Vge voltage decreases down but only to Vth, in the same manner as in FIG. 5(a), since the Ic still remains in non-cutoff condition until when it come to be zero (0), the time of commutation into the FWD is short, and further since the depletion layer of the FWD spreads abruptly when taking place the commutation in the IGBT, the di/dt of the recovery current of the said FWD rises up, then the FWD being reversely connected across the IGBT in parallel cannot follow the cut-off speed of the IGBT, thereby causing vibration of the Vce.

If the FWD being occurred with the vibration in the Vce is the FWD of the upper arm (for example, $D_1$ in FIG. 3(a)), it causes the vibration in the opposite FWD of the lower arm (for example, $D_2$ in FIG. 3(a)).

In this instance, depending upon the characteristics of the FWD, it may sometimes reach to the breakdown of the element of the IGBT, or with the apparatus of method of detecting the short-circuiting of the IGBT by means of the voltage of Vce, it may occurs mal-function or mal-operation therein. Further, the larger the current flowing through the IGBT, the greater or the more remarkable the present phenomenon appears.

In the present invention, there is provided a means for managing the minimal OFF pulse and for preventing from the above-mentioned operation, fitting to each of the IGBTs. Actually saying, since it relates to a delay of the driver circuit, the gate resistance, an input capacity (capacities between the collector and the gate, between the emitter-gate, and between the collector emitter, respectively), it is preferable to determine and manage the time width of the OFF pulse signal fitting to the characteristic of each IGBT, separately. Alternatively, it does not matter that it is constructed so as to turn OFF for the dead time period as a whole with certainty. As a concrete means for achieving this, it may be managed by a software which is written into a MCU of the controller portion, or may be by a hardware within the controller portion or the driver circuit.

Next, by referring to FIGS. 8, 9 and 10, explanation will be given on such the means for managing the minimal OFF pulse by means of the software and the hardware, fitting to the respective one of the above-mentioned IGBTs $S_1$, $S_2$ ... $S_6$, thereby protecting from the mal-function or mal-operation.

Figure 8:
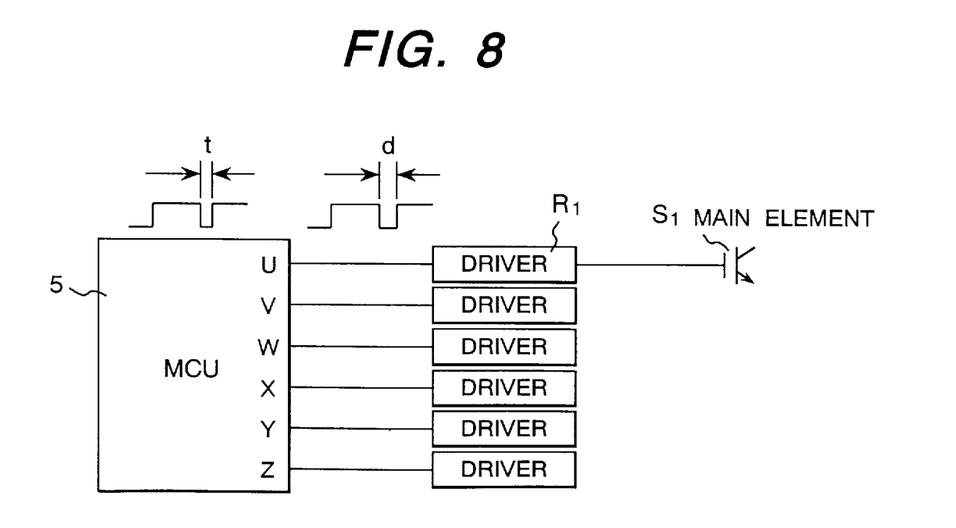
FIG. 8 is a view for explaining a management means of the driving logic signal of the IGBT in the inverter apparatus according to the present invention.

In FIG. 8, there is shown an example of the managing means with a software for the driving signal of the IGBT, in the inverter apparatus according to the present invention. In more detail, if the OFF time t calculated is $t \geq d$ with respect to the dead time d, in the result calculated by the MCU of the controller 5, the OFF signal of the time t is outputted as it is, while if t<d, the OFF signal of the dead time d (t=d) is outputted.

Figure 9:
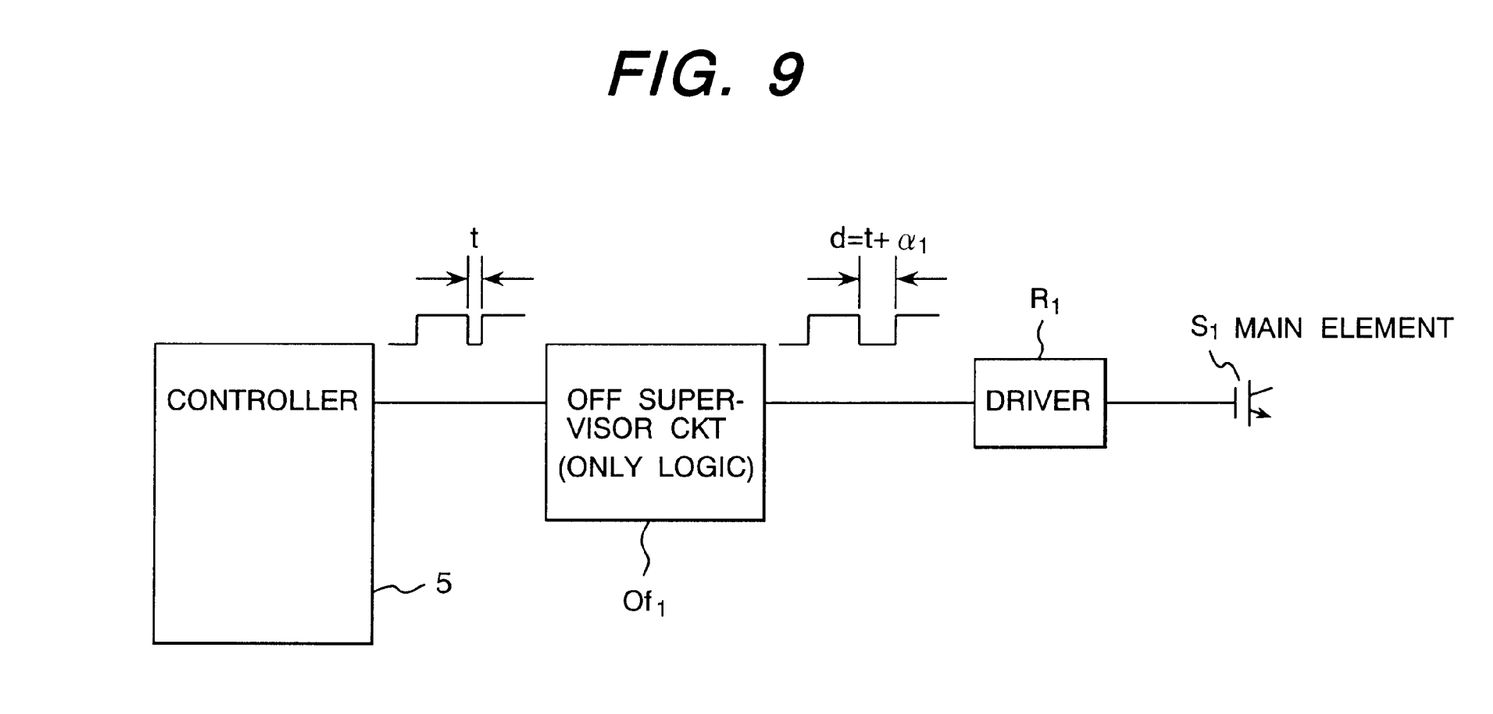
FIG. 9 is also a view for explaining other management means of the driving logic signal of the IGBT in the inverter apparatus according to the present invention.

In FIG. 9 showing an example of the management means in hardware, an OFF supervising circuit $Of_1$ is provided between the controller portion 5 and the driver portion $R_1$, and if $t \geq d$, the OFF signal of time duration t is outputted as it is, while if t<d, the OFF signal of the dead time d (t=d) is outputted, which is added with a time duration $\alpha_1$, i.e., $d=t+\alpha_1$.

Figure 10:
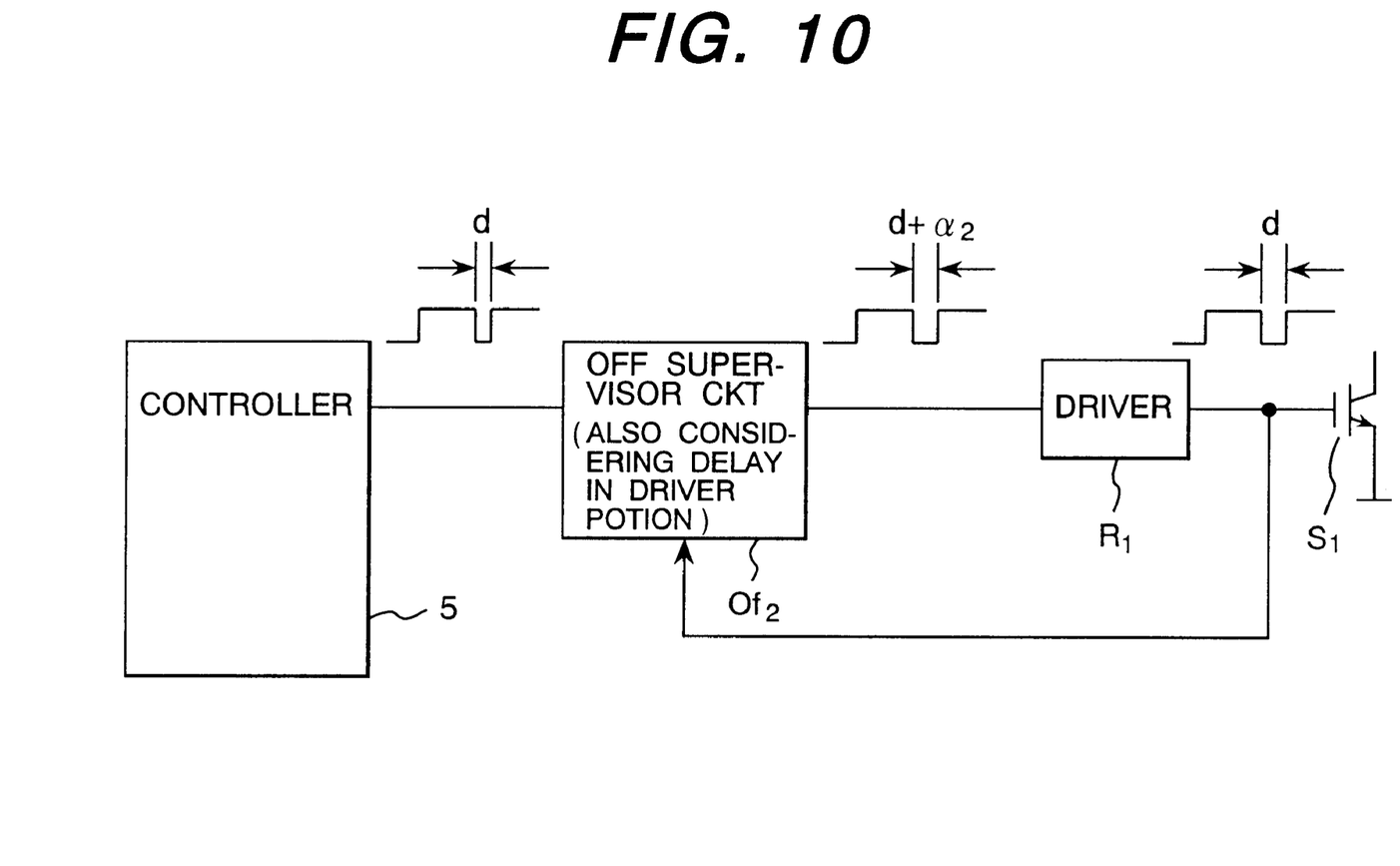
FIG. 10 is a view for explaining further other management means by taking the delay of the driving signal of the IGBT in the inverter apparatus according to the present invention.

FIG. 10 shows other management means in hardware by taking into consideration the delay of the driving signal of the IGBT in the inverter apparatus, according to the present invention.

In the construction of FIG. 10, in the same manner as in FIG. 9, an OFF supervising circuit $Of_2$ is provided between the controller portion 5 and the driver portion $R_1$, thereby an output is provided by adding the time duration $\alpha_2$ to the minimal OFF signal of time duration d, by taking the delay time $\alpha_2$ in the driver portion $R_1$ into consideration.

In each of the above-mentioned embodiments, through the explanation was given only to the OFF supervising circuit $Of_2$ relating to the embodiments shown in FIGS. 9 and 10 in the above, however, enlargement or extension of the OFF time t can be achieved by using various circuits well-known for extending pulse width. And, such the pulse extension circuit, not shown in figures, may be provided between the output of the driver circuit and the IGBT.

The above-mentioned embodiments are explained mainly on a three phase type PWM inverter, however it is needless to say that they can be applied to, not being limited to this, but also to a current control type inverter and a PAM method in a pulse modulation method.

As mentioned in detail in the above, according to the structure of the present invention, there can be provided an inverter apparatus being able to prevent from the breakage or breakdown of the switching elements, by managing the minimal off pulse in the inverter apparatus, applying the high speed switching elements therein, such as the IGBTs or MOS-FETs, as the main switching elements thereof, and further the malfunction of the apparatus due to the erroneous detection of short-circuiting of the switching element(s) thereof.

What is claimed is:

1. An inverter apparatus having at least an inverting portion for inverting a DC electric power into an AC electric power, wherein said inverting portion includes:
   respective high speed switching elements connected in series in upper and lower arms of said inverting portion;
   a flywheel diode being reversely connected across a respective said high speed switching element;
   a driver circuit for driving said high speed switching elements; and
   a controller portion for outputting logical driving ON/OFF signals to said driver circuit for controlling the AC electric power, wherein said controller portion controls so that a time duration of the OFF signal of the logical driving ON/OFF signals to a respective said high speed switching element comes to be equal or greater than a predetermined minimal value which is a dead time of said high speed switching element in one of said upper and lower arms of said inverting portion when only said one of said series connected high speed switching elements in said upper and lower arms of said inverting portion repeats ON/OFF operation.

2. An inverter apparatus as defined in claim 1, further comprising means for supervising the time duration of said OFF signal, wherein said controller portion controls the time duration of the OFF signal on basis of a supervised signal of said supervising means.

3. An inverter apparatus as defined in claim 1, wherein said high speed switching element is an IGBT.

4. An inverter apparatus as defined in claim 1, wherein said high speed switching element is a MOS-FET.

5. An inverter apparatus as defined in claim 1, wherein said predetermined minimal value of said dead time is determined at least depending upon an input capacity of said high speed switching element.

6. An inverter apparatus as defined in claim 1, wherein said predetermined minimal value of said dead time is at least 3 $\mu$sec.

* * * * *